United States Patent [19]

Piggott

[11] 4,005,041

[45] Jan. 25, 1977

[54] AIR-DRYING OR HEAT-CURABLE POLYURETHANE COATING COMPOSITIONS

[75] Inventor: Kenneth Elliot Piggott, Durban, South Africa

[73] Assignee: Prolux Paint Manufacturers (PTY) Limited, Alrode, South Africa

[22] Filed: June 24, 1975

[21] Appl. No.: 590,013

[30] Foreign Application Priority Data

June 25, 1974 South Africa .................. 74/4071
June 25, 1974 South Africa .................. 74/4072

[52] U.S. Cl. .................. 260/18 TN; 260/75 NP;
260/77.5 MA; 260/77.5 AM; 260/77.5 AN
[51] Int. Cl.² .................. C08G 18/12; C08L 91/00
[58] Field of Search ............. 260/77.5 MA, 75 NP, 260/77.5 AM, 77.5 AN

[56] References Cited

UNITED STATES PATENTS

| | | | |
|---|---|---|---|
| 3,352,830 | 11/1967 | Schmitt et al. | 260/77.5 AT |
| 3,549,569 | 12/1970 | Farah et al. | 260/18 TN |
| 3,577,466 | 5/1971 | Nozaki | 260/77.5 MA |
| 3,779,995 | 12/1973 | Dannels et al. | 260/77.5 MA |

OTHER PUBLICATIONS

Condensed Chemical Dictionary (8th ed.) (van Nostrand) (N.Y.) (1971), pp. 172 & 924.
Saunders et al.—Polyurethanes, part II, Technology (Interscience) (N.Y.) (1964), p. 300.

*Primary Examiner*—Donald E. Czaja
*Assistant Examiner*—H. H. Fletcher
*Attorney, Agent, or Firm*—Cushman, Darby & Cushman

[57] ABSTRACT

Air-drying or heat-curable coating compositions are based on allyl ether group-containing isocyanate adducts which are obtained by reacting isophorone diisocyanate with a polyhydroxy compound to give an intermediate containing free isocyanate groups, and then condensing the intermediate with an hydroxyl group-containing allyl ether of an aliphatic diol or polyol.

15 Claims, No Drawings

AIR-DRYING OR HEAT-CURABLE POLYURETHANE COATING COMPOSITIONS

This invention relates to novel air-drying or heat curable allyl ether derivatives of certain isocyanate adducts.

It is commonly known that isocyanates are highly reactive compounds and react with many compounds. This high reactivity is also a danger in handling these chemicals as they are very toxic to the human organism. The volatility or vapour pressure of a di-isocyanate is a measure of its toxicity. The vapour pressure of di-isocyanates can be reduced by reacting them with polyhydric compounds to produce higher molecular weight adducts which still contain free, reactive isocyanate groups.

Several iso-cyanate adducts are available commercially but they suffer from the disadvantage that they are only soluble in solvents such as acetates or ketones. Consequently, if these adducts are used alone or to cross-link other polyhydric compounds, special undercoats or primers are required which are resistant to such solvents as acetates or other strong solvents.

It is an object of the present invention to provide derivatives of iso-cyanate adducts which are soluble in the commonly used aliphatic solvents or mixtures of aliphatic and aromatic solvents. The aliphatic solvents, generally with a Kauri-Butanol number of less than 40, are used in the manufacture of standard oil modified alkyd finishes and because of their low "solvency" power they do not attack earlier paint films applied and hence cause wrinkling or lifting of the previous coats.

The isocyanate adducts employed according to this invention are soluble in aliphatic solvents, or mixtures of aliphatic and aromatic solvents, and will in themselves form films which are hard and glossy with good solvent resistance. This fact will be recognized by those familiar with the art and is due to the cross-linking of the residual isocyanate groups on the adducts with moisture in the atmosphere. It is also acknowledged that to those familiar with the art an allyl ether grouping as represented by the formula

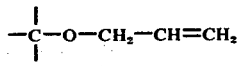

is frequently incorporated with the object of conferring air drying properties to polymers. Both these structural features are combined in the allyl ether derivatives made according to the invention.

According to the present invention there is provided a process for the production of allyl ether group-containing isocyanate adducts useful in coating compositions, comprising reacting isophorone diisocyanate in the presence of a catalyst with a polyhydroxy compound in the proportion of substantially one mole of the diisocyanate to each hydroxyl group, and then condensing the product so obtained with an hydroxyl group-containing allyl ether of an aliphatic diol or polyol.

The compound which is referred to herein as isophorone diisocyanate is 3-isocyanatomethyl-3,5,5-trimethylcyclohexyl isocyanate.

The polyhydroxy compounds which are reacted with the isophorone diisocyanate in the process of the invention may contain two or more than two hydroxyl groups. Polyhydroxy compounds which are particularly suitable may be formed by the reaction of a polybasic acid with an epoxy compound, for example a glycidester compound.

The polybasic acid may be any aromatic or aliphatic saturated polybasic acid such as adipic acid, sebacic acid, isophthalic acid or citric acid, or an unsaturated acid such as maleic acid, fumaric acid or itaconic acid.

It is also possible to use synthetically produced polybasic acids obtained from the reaction of a polyol with an aliphatic or aromatic carboxylic anhydride in the ratio of one mole of polyol to two or more moles of anhydride. For instance a polybasic acid suitable for reaction with the glycidester may be formed from one mole of glycerol and two moles of phthalic anhydride, the anhydride ring being opened at a temperature of between 80° – 120° C. Once the anhydride ring is opened the polybasic acid so formed can then be reacted with the glycidester. Glycidesters which may be used to react with the polybasic acid to form the polyhydroxy compounds for reaction with the di-isocyanate have the general formula:

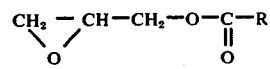

where R is the residue of an organic acid.

These compounds react with the carboxylic acid groups by splitting of the epoxide ring with the simultaneous production of a glycerol-derived residue.

An especially suitable glycidester is that having the above formula wherein R is a branched chain of the formula

Particularly suitable compounds of this type are mixtures of glycidesters wherein $R_1$ and $R_3$ are hydrogen atoms or methyl groups and wherein $R_2$ is a hydrocarbon residue with a straight aliphatic chain, comprising between 1 and 11 carbon atoms. The epoxide equivalent weight of said mixture is about 245. Such compounds are sold by the Shell Chemical Corporation under the trade marks "Cardura E" and "Cardura E10".

The glycidester may be reacted with the polybasic acid at a temperature of between 80° and 200° C until an acid value of below 10 mgms KOH per gm is obtained, indicating that most of the epoxide rings have been opened by the carboxylic acid groups to introduce a glycerol-derived residue. A solvent may be present if so desired.

When the synthetically produced polybasic acids are used it is more convenient in fact to charge the polyol, the anhydride and the glycidester together to the reaction vessel and raise the temperature to 85 — 95° C until the anhydride ring is opened by the polyol, then raising the product temperature to effect the reaction of the remaining groups with the glycidester.

Other polyhydroxy compounds may be blended with the polyhydroxy compound formed from the reaction of the polybasic acids with the glycidester, before the reaction with the di-isocyanate, to give advantageous properties. For instance, castor oil may be added to give improved flexibility to the final product. Alternatively other polyols such as glycerol 1, 2, 6-hexanetriol or polyethylene glycol and polypropylene glycol may be blended for specific purposes.

The polyhydroxy compounds are, as already stated, reacted with the isophorone diisocyanate in the mole ratio of substantially one mole of the diisocyanate to each hydroxyl group present in the polyhydroxy compound. Under these circumstances, one of the isocyanate groups of the isophorone diisocyanate (that attached to the cyclohexane ring through the methylene group) reacts with each hydroxyl group whilst the other isocyanate group remains substantially unreacted. Although it is preferred to react the diisocyanate with each hydroxyl group in a mole ratio of one to one, it is not essential to use precisely this ratio. For instance if slightly less than one mole of diisocyanate to each hydroxyl group is introduced, depending on the conditions of reaction either a degree of cross-linking can be introduced by the fact that both isocyanate groups of a portion of the diisocyanate added now react with the hydroxyl groups present or free hydroxyl groups remain in the product of reaction. Alternatively if more than one mole of the diisocyanate to each hydroxyl group present is added, free monomeric diisocyanate will be present in the adduct.

The reaction of the polyhydroxy compound as described earlier with the diisocyanate is carried out in a solvent or mixture of solvents at a temperature of between 20°– 165° C. It is preferred that a substantial amount of an aliphatic solvent of Kauri-Butanol number less than 40 is present.

A catalyst is added to promote the reaction of the isocyanate group with the hydroxyl group. The catalyst may be a metal salt such as zinc octoate or a tertiary amine or mixtures of these. The type of catalyst used is not specific for the manufacture of the products of this invention. Generally the level of catalyst is between 0,05 and 2,00 percent based on the total weight of the solid reactants.

Following the reaction of the isophorone diisocyanate with the polyhydroxy compound, the free reactive isocyanate group in the adduct so obtained is then reacted with a hydroxyl group-containing allyl ether of an aliphatic diol or polyol. The ratio of each compound taken is such that substantially one hydroxyl group in the allyl ether is allowed for each unreacted isocyanate group remaining in the adduct.

The reaction is carried out in a solvent for the allyl ether derivative thereby produced; this may be an aliphatic solvent, or a mixture of an aliphatic solvent and an aromatic solvent, or if so desired solely an aromatic solvent. The temperature of reaction is between 20° – 200° C and further catalyst may be added to promote the reaction of the hydroxyl group with the remaining isocyanate group. The catalyst may be again a metal complex or salt or a tertiary amine or mixture of these.

Particularly suitable allyl ethers for use in the process of the present invention are allyloxyisopropanol, trimethylol propane di-allyl ether, trimethylol propane mono-allyl ether, glycerol di-allyl ether or pentaerythritol tri-allyl ether. The commercial grade material marketed as trimethylol propane di-allyl ether which can be used according to the invention contains a minimum of 80 percent of the di-allyl ether, not more than 15 percent of the mono-allyl ether and not more than 15 percent of the tri-allyl ether.

The allyl ether derivatives of isocyanate adducts obtained according to the present invention can if so desired be partially polymerised through the allyl groups by the addition of peroxide catalysts to give products of a higher molecular weight which air dry faster than the unpolymerised allyl ether condensates. The partial polymerisation is brought about by adding a peroxide catalyst and heating the product at between 80° – 180° C until a satisfactory increase in viscosity is observed.

The peroxide catalyst may be any suitable peroxide such as cumene hydroperoxide, di-tertiary butyl peroxide, benzoyl peroxide or mixtures of these. The amounts of peroxide catalyst added varies dependent upon the increase in viscosity, molecular weight, required but generally from 0,1 – 4,0 percent on the solid reactant is sufficient.

According to a modification of the present invention, the polyhydroxy compound which is reacted with the isophorone diisocyanate is a copolymer of (i) an $\alpha,\beta$-ethylenically unsaturated ester containing at least one hydroxyl group and (ii) one or more other ethylenically unsaturated compounds.

The $\alpha,\beta$-ethylenically unsaturated ester may be the product of reaction of an $\alpha,\beta$-ethylenically unsaturated mono-or di-basic carboxylic acid or anhydride, and/or an (oxy) alkyl hemiester of such a dibasic acid, with an epoxy compound in order to introduce an hydroxyl group. If a glycidester is used as the epoxy compound, a glycerol derived residue is formed.

A preferred glycidester has the general formula:

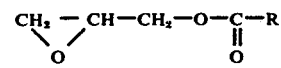

which has been referred to above. An especially suitable glycidester is that having the above formula where R is a branched chain of the formula:

wherein $R_1$, $R_2$ and $R_3$ have the significance previously stated, in particular the compounds of this class, already discussed above, commercially known as Cardura E and Cardura E10.

The copolymer is formed by reacting the $\alpha,\beta$-ethylenically unsaturated ester containing the residual glycerol residue or hydroxyl group or groups with one or more other ethylenically unsaturated monomers. Such other ethylenically unsaturated monomers which are suitable to form the co-polymer are (alkyl) vinyl benzenes, such as vinyl toluene or methyl styrene, and the esters of methacrylic or acrylic acid; for example 2-ethylhexylacrylate; other unsaturated monomers such as styrene, acrylamide, methacrylamide and hydroxyl containing monomers such as hydroxy propyl methacrylate may be included to form the copolymers used in this invention.

The copolymers are formed by polymerising the ethylenically unsaturated monomer or monomers with the residual hydroxyl group or groups in the presence of a peroxide catalyst or azo compound. The process may be carried out in the presence of a solvent with a Kauri-Butanol number of below 40 or alternatively in a mixture of an aliphatic and aromatic solvent or if so desired completely in an aromatic solvent.

The process of polymerisation may in some cases also be carried out in the absence of a solvent and when the polymerisation has been completed the product is dissolved in the solvent.

Particularly advantageous copolymers are formed with a more even distribution of hydroxyl groups along the polymer chain if the ethylenically unsaturated monomers are mixed with the $\alpha,\beta$-ethylenically unsaturated ester containing the residual hydroxyl group or groups and the peroxide catalyst and the whole "drip-fed" into the reactor over a specified period. The temperature at which the polymerisation takes place is between 80° – 200° C.

The isocyanate adduct is then formed by reacting isophorone diisocyanate with the copolymer in a solvent at a mole ratio of substantially one mole of diisocyanate to every hydroxyl group present in the copolymer, as before, and the adduct is subsequently reacted with the allyl ether as already described.

The allyl ether derivatives obtained by the process of the present invention can be formulated into clear varnishes or pigmented coatings which with the addition of cobalt soaps such as cobalt naphthenate or cobalt octoate dry very quickly to form very hard, abrasive resistant and glossy films of good solvent resistance. Varnishes or coatings may be applied easily by brush, roller or spray over conventional alkyd-based undercoats or primers, without danger of "lifting" or wrinkling these previous coats. The products can be pigmented, for example with titanium dioxide, to give a single pack stable white enamel which is completely soluble in aliphatic solvents of Kauri-Butanol number below 40 or a mixture of aliphatic solvent and aromatic solvent alone, and which dries quickly to give a hard, tough film which shows superior colour retention and resistance to yellowing in service.

The invention is illustrated by the following examples, in which parts and percentages are by weight:-

Example 1

Stage 1 a. 210 parts by weight of citric acid hydrate 750 parts by weight of Cardura E (glycidyl ester of a saturated synthetic tertiary monocarboxylic acid having $C_9$, $C_{10}$, and $C_{11}$ chain length)

The two ingredients are heated under an inert atmosphere to 90° C. The heat source is removed and the temperature allowed to carry from the exotherm up to 185°–190° C. The temperature is held there until the acid value falls to 2,1 mgms KOH per gm.

b. 545 parts by weight of Castor Oil The oil is added to the product from (a) and a temperature of 150° C is held for 30 minutes.

c. 1,400 parts by weight of white spirits 1,210 parts by weight isophorone diisocyanate The white spirits is added to the product from (c) in the reaction vessel and the temperature brought down to 60° C. The isophorone diisocyanate is then added and the temperature adjusted to 65° C. Fifty four parts by weight of a 10 percent solution in xylene of di-butyl tin di-laurate are added and the temperature rises to 78° C. This temperature is held for 2 hours, then raised to 95° C and held for four hours. The product has a non-volatile content (2 – 3 gms of product at 1 hour at 140° C) of 65,1 percent, a viscosity of U – V (Gardner-Holdt bubble tube scale) at 25° C and a specific gravity of 0,952 at 25° C.

Stage 2

750 parts by weight of the product from stage 1
250 parts by weight of white spirits
260 parts by weight of a commercial grade of tri-methylol propane di-allyl ether.

The ingredients are charged to a reaction vessel and heated to 60° C. Ten parts by weight of a ten percent solution in xylene of di-butyl tin di-laurate are added and the temperature rises to 75° C. This temperature is held for 2 hours, then increased to 90°–95° C and held for a further 4 hours. The product has a non-volatile content of 53,9 percent, with a viscosity (G.H.) of S – T at 25° C and a specific gravity of 0,915 at 25° C.

Example 2

A white enamel is prepared from the product of Example 1 at a pigment to binder ratio of 0,9 to 1,0, and cobalt celerate to give 0,06 percent cobalt metal on binder solids. The enamel has a viscosity of 115 seconds on a Ford Number 4 Cup at 25° C and a specific gravity of 1,21.

Films are cast on glass panels, using an applicator with a gap of 0,003 inches, of the enamel made as just described, and also of a conventional white enamel based on a semi-drying oil modified alkyd. The hardness after 16 and 48 hours drying respectively at a temperature of 78° F is measured by a Sward Pendulum Hardness Tester, glass being taken as 100.

|  | 16 hrs | 48 hrs |
|---|---|---|
| Enamel as described above | 20 | 30 |
| Conventional white enamel | 6 | 8 |

To compare the initial whiteness and colour retention on exposure to ammonia fumes, a Photovolt Reflection Meter is used which has been calibrated against freshly deposited magnesium oxide as a standard at 100.

The films are exposed to ammonia fumes for 18 hours, with the following results:-

|  | Initial | Ammonia |
|---|---|---|
| White enamel as described above | 86,5 | 86,0 |
| Commercial white alkyd enamel | 84,5 | 79,0 |

The higher reflectance figures, initially and after exposure, of the enamel prepared as described above illustrate the superior colour retention compared to the conventional oil modified alkyd-based enamel.

Example 3

Stage 1

540 parts by weight of fumaric acid 2460 parts by weight of Cardura E (Trade Mark, Shell Chemical Corporation)

The ingredients are heated to 110° C in a reaction vessel and the heat source removed. The exotherm carries the temperature to 185°–190° C. The temperature is held until the product has an acid value of 1,8 mgms KOH per gm with a viscosity of $Z_4$ – $Z_5$ (Gardner Holt bubble tube scale) at 25° C. The product is diluted to 80 percent non volatile content with white spirits and has a viscosity of L − M (G.H.) at 25° C and a specific gravity 0,995.

Stage 2
 a. 1215 parts by weight of white spirits
   132 parts by weight of the product from Stage 1 at 80 percent solid content
   36 parts by weight of vinyl toluene
   4 parts by weight of di-tertiary butyl peroxide
 The ingredients are heated to 160-5° C in a reaction vessel fitted with a water cooled condenser.
 b. 1182 parts by weight of the product from Stage 1 at 80 percent non-volatile content
   324 parts by weight of vinyl toluene
   90 parts by weight of styrene
   19 parts by weight of di-tertiary butyl peroxide
 The ingredients are mixed and added slowly to the product from (a) in the reaction vessel over 3 hours, keeping the temperature at 160°–5° C. This temperature is held for a further 4 hours, when the product has a non-volatile content (2–3 gms of product heated 1 hour at 140° C) of 49.8 percent and a viscosity as measured by Ford Number 4 Cup of 45 seconds at 25° C.

Stage 3
 a. 1720 parts by weight of the product from Stage 2.
   440 parts by weight of Isophorone diisocyanate
 The ingredients are charged to a reaction vessel and heated to 60° C. Eighteen parts by weight of a ten percent solution in xylene of di-butyl tin di-laurate are added and the temperature rises to 70°–5° C. The temperature is held for 2½ hours.
 b. 520 parts by weight of a commercial grade of Trimethylol propane di-allyl ether (containing a minimum of 80 percent of the di-allyl ether, a maximum of 15 percent of triallyl ether)
 The allyl ether is added to the product from (a) in the reaction vessel and eighteen parts by weight of a 10 percent solution in xylol of di-butyl tin di-laurate are added. The temperature is held at 70°–5° C for two hours then raised at 95°–100° C. This temperature is held for two hours.
 c. 950 parts by weight of white spirits
 The solvent is added to the product from (b) and the final product has a non-volatile content of 49,5 percent, a viscosity of W − X (G.H.) at 25° C and a specific gravity of 0,896 at 25° C.

Example 4

Stage 1
 a. 535 parts by weight of white spirits
   132 parts by weight of product from Example 3, Stage 1 at 80 percent solids content
   36 parts by weight of vinyl toluene
   4 parts by weight of di-tertiary butyl peroxide
 The ingredients are heated to 160°–5° C in a reaction vessel fitted with a water cooled condenser.
 b. 748 parts by weight of product from Example 3, Stage 1
   161 parts by weight of vinyl toluene
   180 parts by weight of 2-ethyl hexyl acrylate
   20 parts by weight of di-tertiary butyl peroxide
 The ingredients are mixed and added slowly to the product from (a) in the reaction vessel over a period of 3 hours. The temperature is held for a further four hours, when the product has a non-volatile content of 60,9 percent and a viscosity of I (GH) at 25° C.

Stage 2
 a. 1080 parts by weight of the product from Stage 1
   300 parts by weight of isophorone diisocyanate
 The ingredients are heated to 60° C and 9 parts by weight of a ten percent solution of dibutyl tin di-laurate in xylene are added. The temperature rises to 73° C. This temperature is held for 2 hours and the viscosity is then $Z_3 - Z_4$ (G.H.) at 25° C.
 b. 650 parts by weight of white spirits
   370 parts by weight of a commercial grade of Trimethylol propane di-allyl ether.
 The ingredients are added to the product from (a) in the reaction vessel and heated to 65° C. Nine parts by weight of a ten percent solution of di-butyl tin di-laurate are added and the temperature is held at 80° C for 2 hours. The temperature is then raised to 95° C and held for four hours, when the product has a non-volatile content of 53,6 percent and a viscosity of W − X (G.H.) at 25° C and a specific gravity of 0,909.

Example 5

A white enamel is prepared from the product of Example 4, stage 2, as follows:
 550 parts by weight of titanium dioxide
 1020 parts by weight of the product from Example 4, stage 2
 4 parts by weight of soya lecithin
 25 parts by weight of dipentene
 4 parts by weight of pine oil
 10 parts by weight of xylene
 2,5 parts by weight of a cobalt celerate solution containing 12 percent metal content
 5 parts by weight of a calcium celerate solution containing 5 percent metal content
 95 parts by weight of Petropine (aliphatic solvent of Kauri-Butanol Number 38).

The viscosity of this enamel is 115 secs on a Ford 4 cup at 25° C and the specific gravity 1,226 at 25° C.

Films are case on glass panels using an applicator having a gap of 0.003 inches. At the same time similar films are cast on panels of a commercially available white enamel based on a semi-drying oil modified alkyd.

After drying at room temperature for 16 hours and 48 hours respectively the hardness of the films as measured with a Sward Pendulum Hardness Tester (glass taken as 100) is shown:

|  | 16 hours | 48 hours |
| --- | --- | --- |
| White enamel as described above | 16 | 26 |
| Commercial alkyd based enamel | 4 | 6 |

To compare the initial whiteness and colour retention on exposure to chemical contaminants a Photovolt Reflection Meter is used which has been calibrated against freshly deposited magnesium oxide as a standard at 100.

The films are exposed to ammonia and hydrogen sulphide fumes respectively for 16 hours.

|  | Initial | Ammonia | Hydrogen Sulphide |
| --- | --- | --- | --- |
| White enamel as described above | 86,0 | 86,0 | 84,5 |
| Commercial white alkyd enamel | 84,0 | 80,5 | 76,5 |

The higher reflectance figures initially and after exposure of the enamel as described above illustrate the superior colour retention to the conventional alkyd based white enamel.

Example 6 a. 58 parts by weight of fumaric acid
750 parts by weight of Cardura E
296 parts by weight of phthalic anhydride
276 parts by weight of white spirits The above ingredients are charged to a reactor and heated at 185° – 90° C until the product has an acid value of 3,8 mgms KOH/gm and a viscosity of Y (G.H.) at 25° C. The product is cooled to 40° C and mixed with the following:- b. 100 parts by weight of 2-ethyl hexyl acrylate
175 parts by weight of vinyl toluene
15 parts by weight of di-tertiary butyl peroxide A reactor is charged with 675 parts of white spirits and the contents heated to 160° C with stirring. To the reactor is then added the mixed monomers as shown above, with the peroxide catalyst, over a period of 2½-3 hours, maintaining the temperature at 160° – 5° C. The product is held for a further 4 hours at reflux temperature. The final characteristics of the product are: non-volatile content, 59,7 percent; viscosity I (G.H.) at 25° C.

The product is cooled to 80° C and to the reactor is added:
220 parts by weight of isophorone diisocyanate
10 parts of a 10 percent solution of di-butyl tin di-laurate in xylol The temperature of the mixture is held at 90° C for 2 hours and a further addition made of:
260 parts by weight of trimethylol propane di-allyl ether.

Again the temperature is held at 90° C for two hours, and the final characteristics of the product are:
Non volatile content: 64.3 percent
viscosity : $Z_1 - Z_2$ (G.H.) at 25° C
Acid value: — 1,8 mgms KOH/gm
Specific gravity: — 0,958

A white enamel is formulated on this vinyl-modified urethane allyl ether, at a pigment to binder ratio of 1/1 by weight on solids, using RCR2 titanium dioxide, 0,05 percent cobalt metal (on resin solids) and 0,1 percent (on paint) of methyl ethyl ketoxime. This enamel dries to the touch inside four hours, and is very hard after curing overnight.

Air dried brushed films of this white enamel when exposed to an atmosphere of ammonia for 24 hours, show considerably less "yellowing" than a similar enamel based on a conventional long oil-alkyd resin.

Example 7 a. 327 parts by weight of polypropylene glycol mol wt 425
302 parts by weight of maleic anhydride
771 parts by weight of Cardura E10

The above ingredients are charged to a reactor and held at 90° C for 30 minutes. The temperature is then increased to 180° C and held there until the product has an acid value below 5 mgms KOH g. 800 Parts of white spirits and 120 parts of "Shellsol A" (a hydrocarbon solvent of boiling range 162°–180° C, containing 98 percent aromatics, mainly trimethylbenzenes) are then added and the mixture cooled to 80° C.

b. 340 parts by weight of isophorone diisocyanate
10 parts by weight of 10 percent solution in xylol of dibutyltin dilaurate The above ingredients are added to the product from a. and the mixture is held at 90° C for 2 hours. c. 400 parts by weight of trimethylolpropane diallyl ether This ingredient is added to the product from (b) and the mixture is again held at 90° C for 2 hours. The final product has a non-volatile content of 69.7 percent and viscosity (G.H.) of U – V.

A. Cobalt metal drier is added to the final product from (c) at the rate of 0.075% cobalt metal on resin solids. The resulting varnish dries to the touch in 6 hours and is hard after curing overnight.

B. The product from (c) is blended with the product described in Example 6 in the ratio of 30 parts to 70 parts by weight respectively. On addition of cobalt drier, at 0.075 percent metal on resin solids, the blend dries to the touch in four hours and gives a clear, hard film on curing overnight.

What we claim is:

1. A process for the production of allyl ether group-containing isocyanate adducts useful in coating compositions, comprising reacting isophorone diisocyanate in the presence of a catalyst with a polyhydroxy compound in the proportion of substantially one mole of the diisocyanate to each hydroxyl group, and then condensing the product so obtained with an hydroxyl group-containing allyl ether of an aliphatic diol or polyol in an amount such that substantially one hydroxyl group in the allyl ether is used for each unreacted isocyanate in said product.

2. A process as claimed in claim 1, wherein the polyhydroxy compound is formed by the reaction of a polybasic acid with an epoxy compound.

3. A process as claimed in claim 2, wherein the polybasic acid is the product of reaction of one mole of a polyol and at least two moles of an aliphatic or aromatic carboxylic anhydride.

4. A process as claimed in claim 2, wherein the epoxy compound is a glycidester having the general formula:

$$CH_2 \underset{O}{\overset{}{\diagdown\!\!\!/}} CH-CH_2-O-\underset{\underset{O}{\|}}{C}-R$$

where R is the residue of an organic acid.

5. A process as claimed in claim 4, wherein the group R in the glycidester is a branched chain grouping of the formula $$-C\underset{R_3}{\overset{R_1}{\underset{\|}{-}R_2}}$$

where $R_1$ and $R_3$ are hydrogen atoms or methyl groups and $R_2$ is a straight-chain aliphatic hydrocarbon residue containing between 1 and 11 carbon atoms.

6. A process as claimed in claim 2 wherein the polyhydroxy compound formed from the polybasic acid and the epoxy compound is blended with another polyhydroxy compound before reaction with the diisocyanate.

7. A process as claimed in claim 1 wherein the hydroxyl group-containing allyl ether is allyloxyisopropanol, trimethylol propane diallyl ether, trimethylolpropane monoallyl ether, glycerol diallyl ether or pentaerythritol triallyl ether.

8. A modification of the process as claimed in claim 1, wherein the allyl groups present in the final product are partially polymerised in the presence of a peroxide catalyst.

9. A process as claimed in claim 1, wherein the polyhydroxy compound is a copolymer of (i) an α,β-ethylenically unsaturated ester containing at least one hydroxyl group and (ii) one or more other ethylenically unsaturated compounds.

10. A process as claimed in claim 9, wherein the α,β-ethylenically unsaturated ester is the product of reaction of an α,β-ethylenically unsaturated mono- or di-basic carboxylic acid or anhydride, and/or an (oxy) alkyl hemiester of such a dibasic acid, with an epoxy compound.

11. A process as claimed in claim 10, wherein the epoxy compound is glycidester having the general formula:

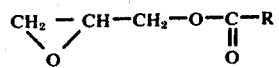

where R is the residue of an organic acid.

12. A process as claimed in claim 10, wherein the group R in the glycidester is a branched chain grouping of the formula

where $R_1$ and $R_2$ are hydrogen atoms or methyl groups and $R_2$ is a straight-chain aliphatic hydrocarbon residue containing between 1 and 11 carbon atoms.

13. A process as claimed in claim 9, wherein the other ethylenically unsaturated compound is vinyl toluene or 2-ethylhexyl acrylate.

14. An allyl ether group-containing isocyanate adduct obtained by a process as claimed in claim 1.

15. A clear varnish or pigmented coating prepared from an adduct as claimed in claim 14 with the addition of a cobalt soap drier.

* * * * *